United States Patent
Villegas Muriel et al.

(10) Patent No.: US 10,267,210 B2
(45) Date of Patent: Apr. 23, 2019

(54) SYSTEMS AND METHODS FOR CONTROLLING AIRFLOW THROUGH A POWER STEERING SYSTEM

(71) Applicant: Ford Global Technologies, LLC, Dearborn, MI (US)

(72) Inventors: Roberto Villegas Muriel, Atizapan de Zaragoza (MX); Timothy Gerard Offerle, Saline, MI (US); Dale Killins, Canton, MI (US); Darin Charles Petrini, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 15/338,171

(22) Filed: Oct. 28, 2016

(65) Prior Publication Data
US 2018/0119595 A1    May 3, 2018

(51) Int. Cl.
| B62D 5/06 | (2006.01) |
| F01P 7/02 | (2006.01) |
| F01P 1/06 | (2006.01) |
| F01P 5/02 | (2006.01) |

(52) U.S. Cl.
CPC .................. *F01P 7/02* (2013.01); *B62D 5/06* (2013.01); *B62D 5/062* (2013.01); *F01P 1/06* (2013.01); *F01P 5/02* (2013.01); *F01P 2037/00* (2013.01)

(58) Field of Classification Search
CPC ........ F01P 7/02; F01P 1/06; F01P 5/02; F01P 2037/00; B62D 5/062
See application file for complete search history.

(56) References Cited

U.S. PATENT DOCUMENTS

| 4,425,766 | A | 1/1984 | Claypole |
| 5,002,117 | A | 3/1991 | Buckley et al. |
| 5,839,398 | A | 11/1998 | Hamilton |
| 6,832,969 | B2 | 12/2004 | Saarinen et al. |
| 7,155,907 | B2 | 1/2007 | Desjardins et al. |
| 7,360,357 | B2 | 4/2008 | Zahniser |
| 8,396,628 | B2 | 3/2013 | Lavoie et al. |
| 2003/0172883 | A1* | 9/2003 | Shiozaki ................. F01P 7/042 123/41.12 |
| 2009/0024281 | A1* | 1/2009 | Hwang .................. B62D 5/006 701/42 |
| 2011/0253607 | A1* | 10/2011 | Becker ................... B01D 35/02 210/131 |
| 2014/0180545 | A1 | 6/2014 | Bang |
| 2015/0120129 | A1* | 4/2015 | Lee ..................... B60R 16/0231 701/29.1 |

OTHER PUBLICATIONS

Tom Denton, Steering Angle Sensor, May 26, 2010, Automotive Technology, p. 2 Paragraph 2.*

* cited by examiner

*Primary Examiner* — Jacob Amick
*Assistant Examiner* — Charles Brauch
(74) *Attorney, Agent, or Firm* — Julia Voutyras; McCoy Russell LLP

(57) ABSTRACT

Methods and systems are provided for preventing overheating of a power steering system. In one example, a method includes operating an engine cooling fan based on a steering wheel angle and an engine speed. The cooling fan may be operated for a duration based on the steering wheel angle and engine speed, thus eliminating the need for a dedicated power steering coolant temperature sensor.

16 Claims, 7 Drawing Sheets

US 10,267,210 B2

SYSTEMS AND METHODS FOR CONTROLLING AIRFLOW THROUGH A POWER STEERING SYSTEM

FIELD

The present description relates generally to a hydraulic power steering system for a vehicle.

BACKGROUND/SUMMARY

Most modern automobiles are equipped with a hydraulic power steering system. A hydraulic power steering system typically comprises a hydraulic circuit carrying a pressurized fluid (e.g., oil) from a reservoir to a steering actuator via a pump, which is mounted on an engine accessory drive. As a vehicle steering wheel is moved, the steering gear uses hydraulic pressure from the pump to assist with turning the vehicle wheels. The hydraulic power steering system generates heat during this process. When the power steering system overheats, it can cause damage to the power steering pump.

Other attempts to address hydraulic power steering system overheating problems typically include adding a power steering fluid cooler to the system. The cooler acts by exchanging heat from the fluid into the air, and thus scenarios where airflow through the engine is limited may not provide enough cooling to limit pump damage. For example, air flow is limited in scenarios wherein vehicle speeds are low. Further, in cold weather, the engine cooling fan may not activate, thus limiting air flow through the cooler.

Other attempts to address hydraulic power steering overheating include positioning a temperature sensor within the hydraulic fluid circuit. One example approach is shown by Desjardins et al. in U.S. Pat. No. 7,155,907. Therein, a thermoreactive control valve is placed at the inlet of the hydraulic fluid reservoir. The control valve is further coupled to a cooling fan, such that the control valve controls and limits operation of the cooling fan based on the temperature of the hydraulic fluid.

However, the inventors herein have recognized potential issues with such systems. As one example, the addition of a dedicated control valve or temperature sensor to the power steering system increases the manufacturing costs of the vehicle. Further, the output of such a valve or sensor may lag behind the real-time temperature of the hydraulic fluid. This may result in a delayed response from the cooling fans, which may fail to mitigate damage from an overheating power steering system.

In one example, the issues described above may be addressed by a method that includes adjusting operation of an engine cooling fan based on an engine speed and a steering wheel angle; and operating the engine cooling fan for a duration. In this way, the air flow through the steering cooler is increased in response to heat generation in the steering system, thereby decreasing pump overheating issues.

As one example, the cooling fan may be activated for a duration based on the engine speed and steering wheel angle. The duration may thus be proportionate to an inferred power steering fluid temperature, thereby eliminating the need for a dedicated power steering fluid temperature sensor. In this way, the operational elements which have the greatest impact on power steering overheating may be utilized to actively prevent system overheating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
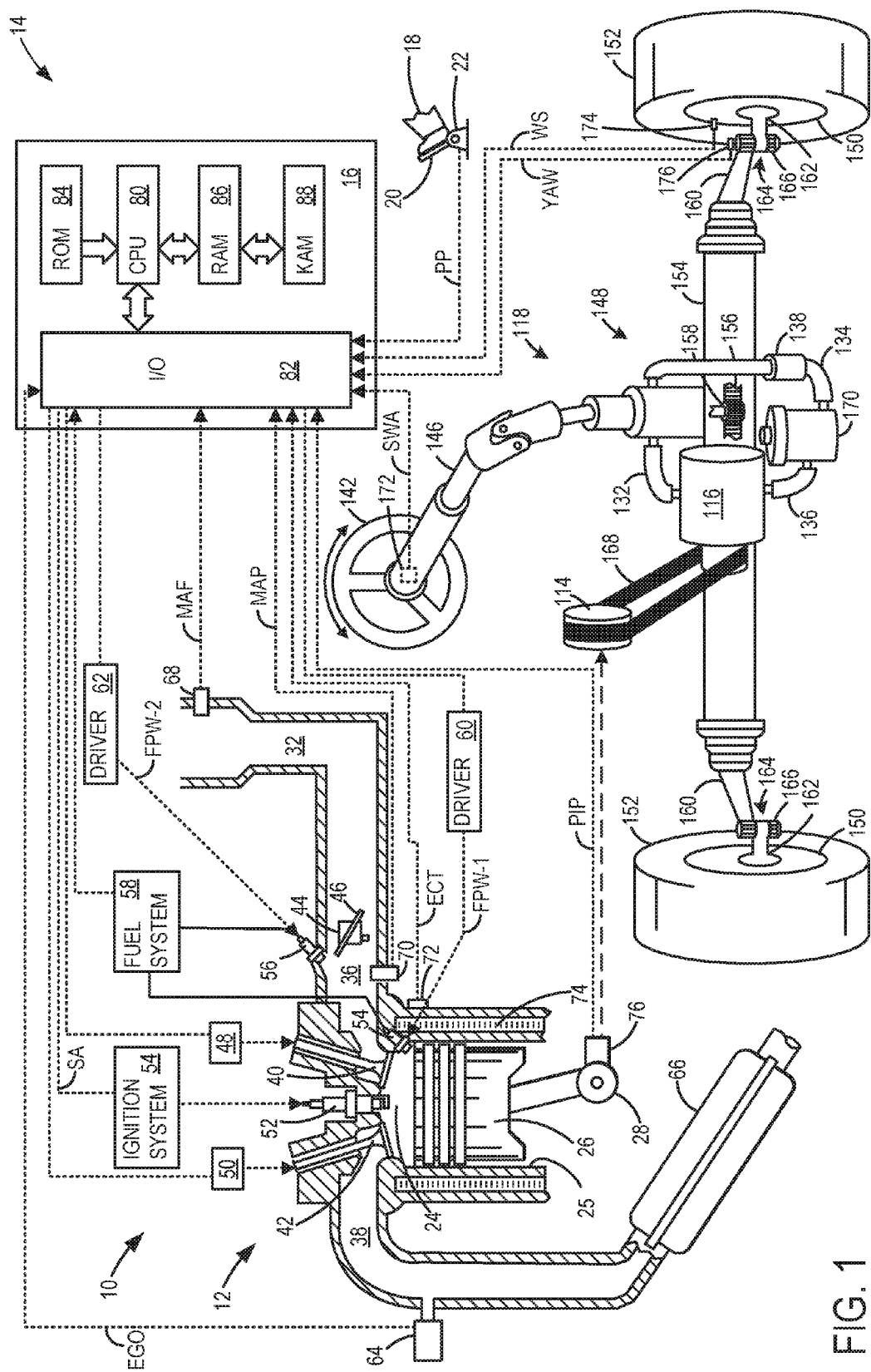
FIG. 1 is a schematic illustration of an example engine and power steering layout within a vehicle system.
Figure 3:
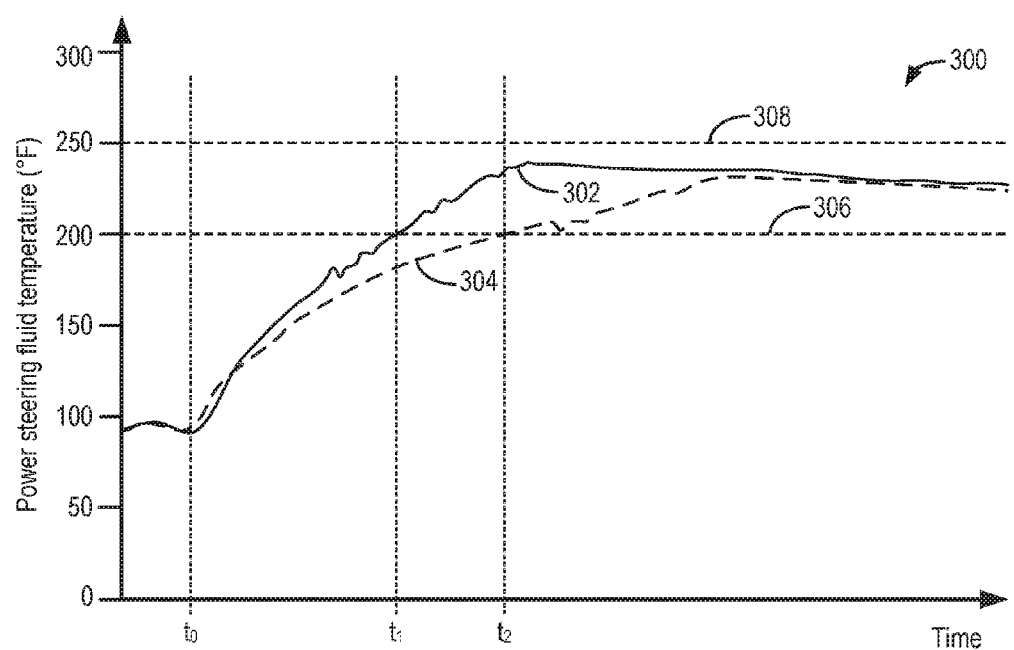
FIG. 3 shows a graph demonstrating delayed power steering system overheating in response to engine cooling fan activation.
Figure 4:
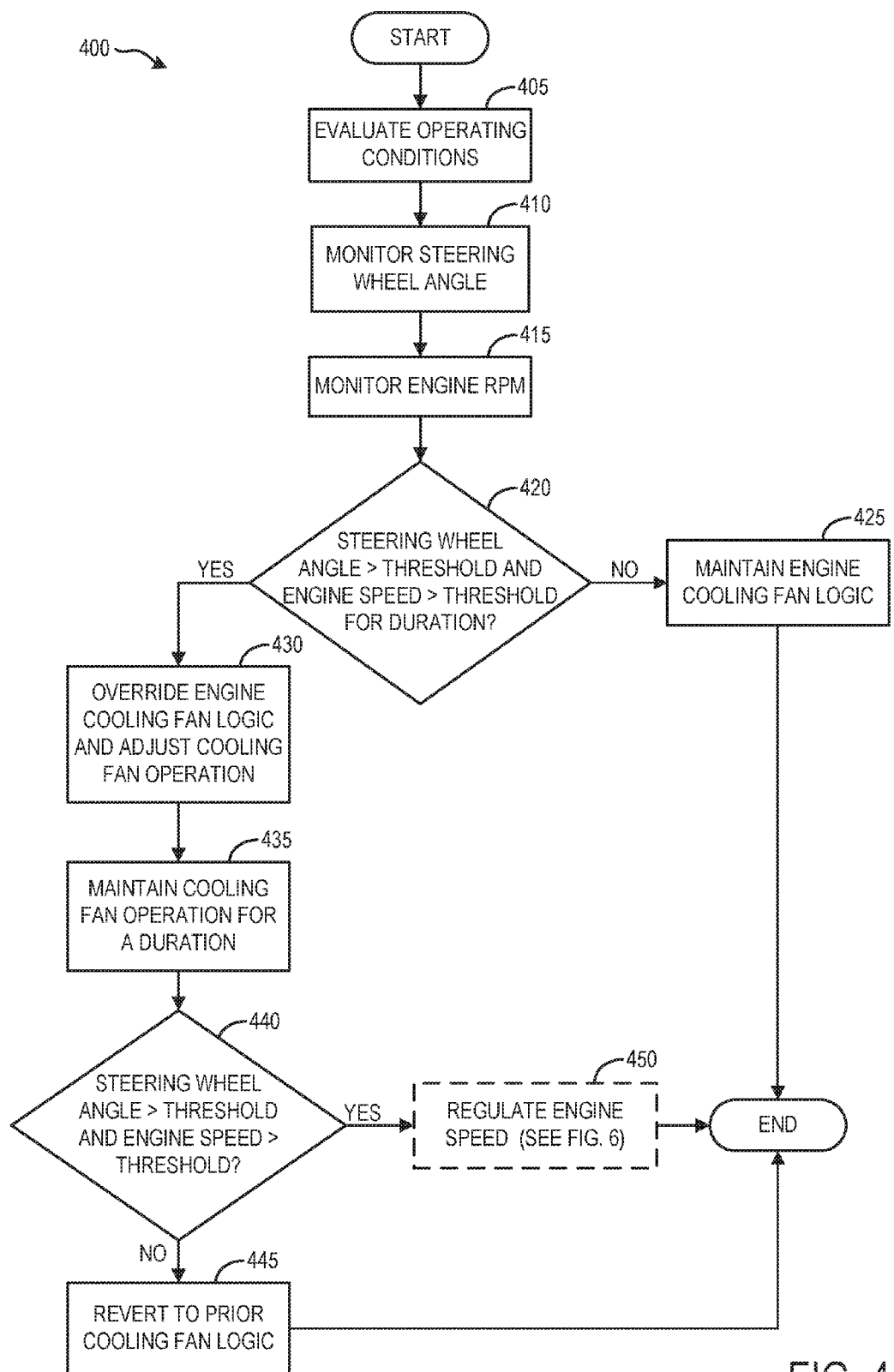
FIG. 4 is an example flow chart illustrating a high-level method for adjusting engine cooling fan operation based on steering wheel angle and engine speed.
Figure 5:
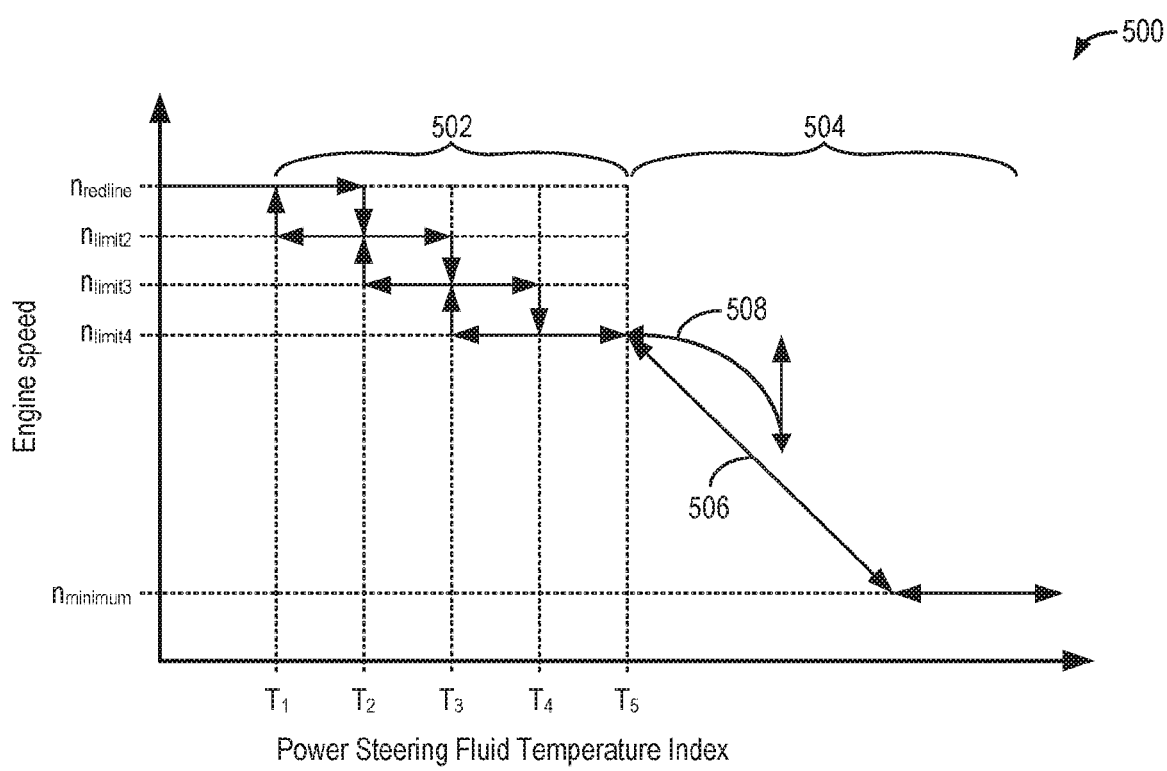
FIG. 5 shows a graph illustrating a strategy for reducing power steering system temperature by limiting engine speed.
Figure 6:
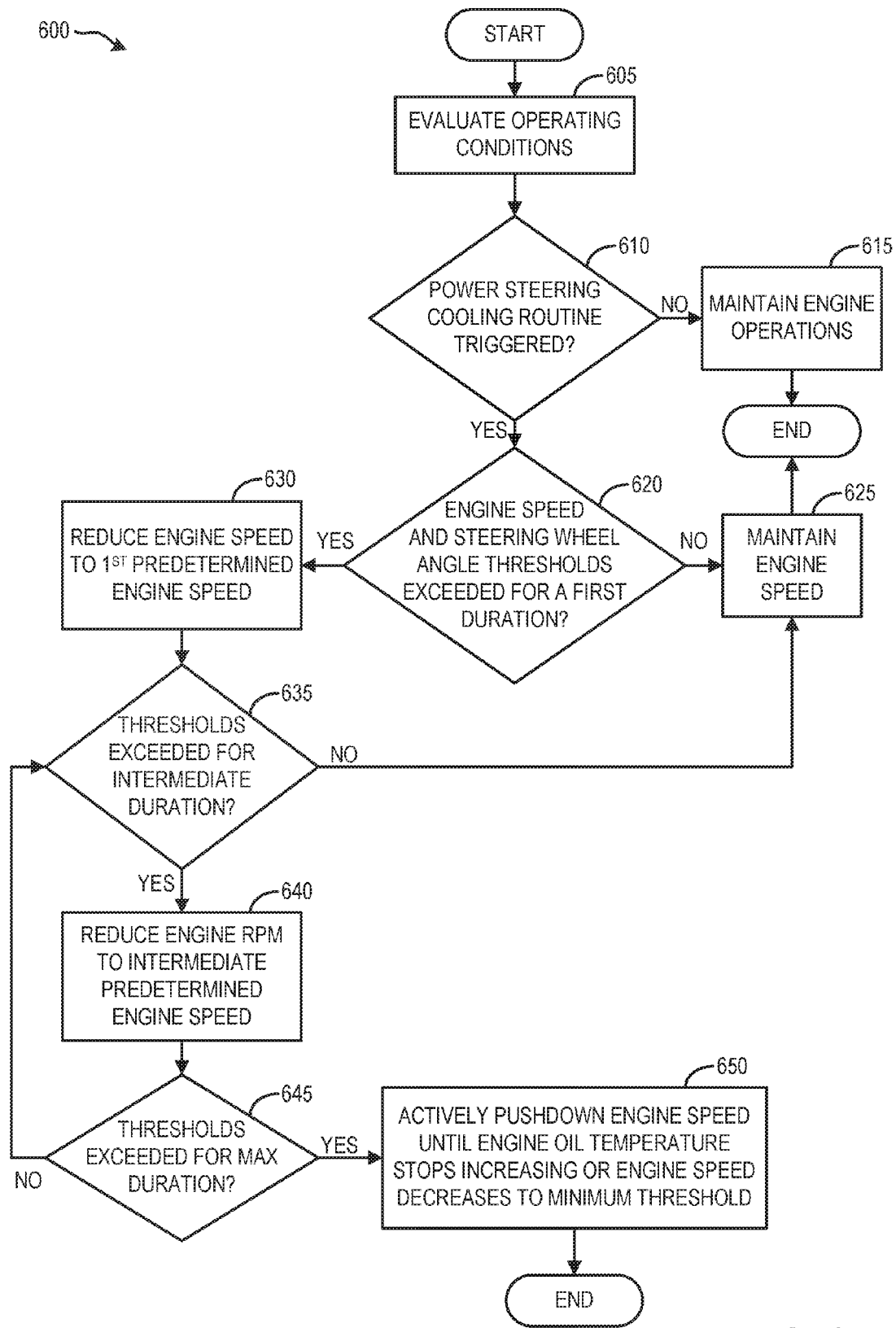
FIG. 6 is an example flow chart for a high-level method for adjusting engine speed to influence power steering temperature.
Figure 7:
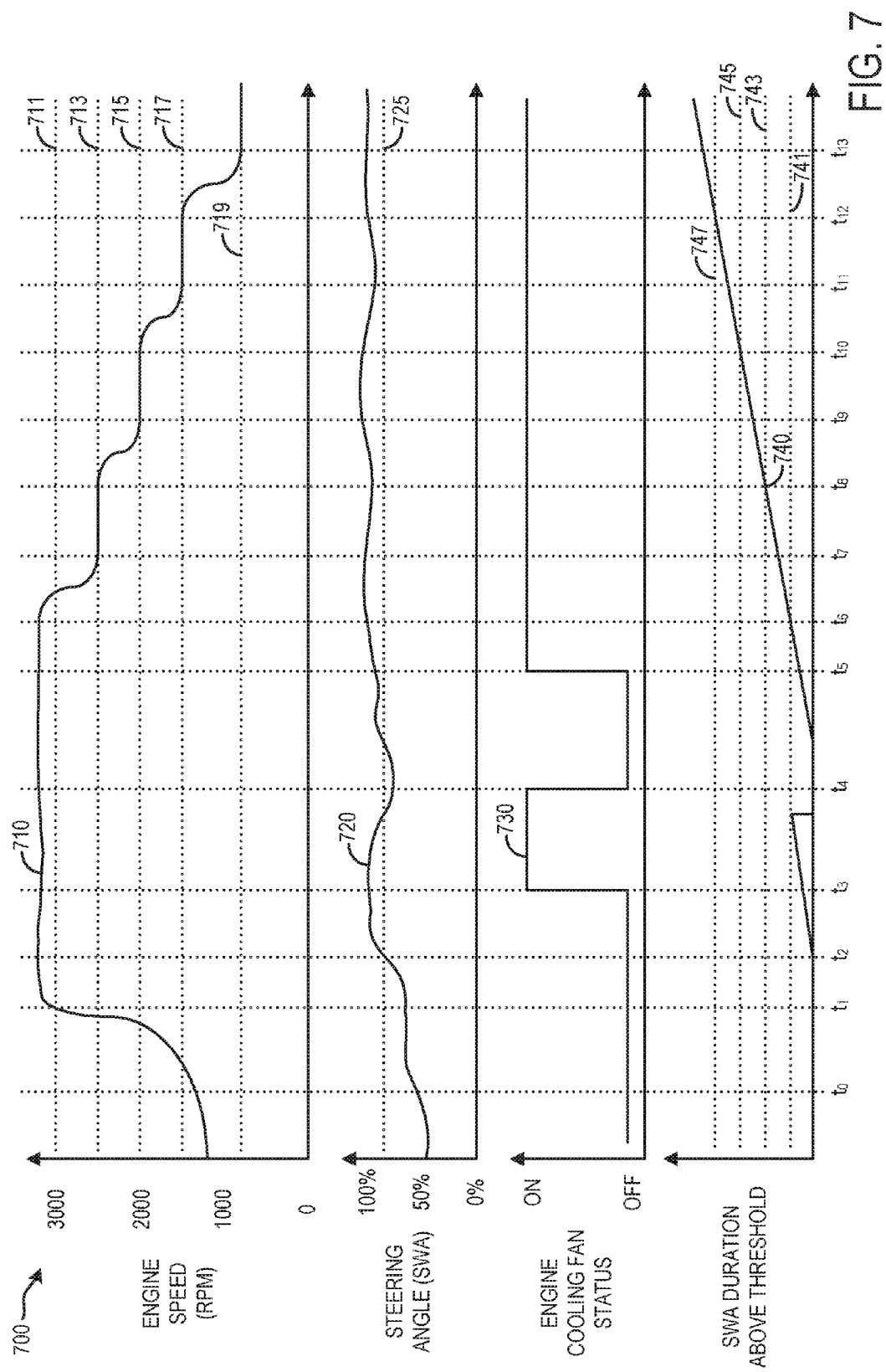
FIG. 7 is a timeline for engine operation in accordance with the methods shown in FIGS. 4 and 6.

The following description relates to systems and methods for a vehicle power steering system. More specifically, the description relates to proactively mitigating the overheating of power steering fluid through the activation of engine cooling fans based on engine speed and steering wheel angle. As shown in FIG. 1, a vehicle power steering system may include a hydraulic steering fluid circuit including a high pressure pump. The high pressure pump may be belt driven and coupled to the vehicle engine as part of an accessory drive bracket. As such, the pump may spin at a speed proportionate to the speed of the engine, generating heat. Furthermore, as the steering wheel angle increases, pressure in the power steering system may also increase, further increasing the temperature of steering fluid. The hydraulic power steering fluid circuit may comprise a cooler configured to reduce the temperature of the steering fluid. However, in response to a pressure increase, the pump may actuate a valve and recirculate a portion of the fluid. The recirculated portion may not reach the cooler and thus limit any overall reduction in fluid temperature. An engine cooling fan, such as the cooling fan shown as part of the engine cooling system in FIG. 2, may increase airflow across the steering fluid cooler to increase. As shown in FIG. 3, this may reduce the rate of fluid temperature increase. However, the cooling fan may not be active during scenarios such as low vehicle speed or low ambient temperature. FIG. 4 shows an example method whereby engine cooling fans are activated based on engine speed and steering wheel angle. Further, in some scenarios additional power steering temperature control may be affected by limiting engine RPM, as shown in FIG. 5. Such a strategy may be employed in addition to engine cooling fan operations to limit power steering fluid temperature. FIG. 6 illustrates one such method. An example timeline for engine operation using these described engine control strategies is shown in FIG. 7.

FIG. 1 is a schematic diagram showing a vehicle 10. Vehicle 10 includes a multi-cylinder engine 12 of which one cylinder is shown. Engine 12 may be controlled at least partially by a control system 14 including an engine controller 16 and by input from a vehicle operator 18 via various input devices. In one example, an input device includes an accelerator pedal 20 and a pedal position sensor 22 for generating a proportional pedal position signal that is used by engine controller 16 to determine engine load and adjust engine output. Combustion chamber (i.e., cylinder) 24 of engine 12 may include combustion chamber walls 25 with piston 26 positioned therein. Piston 26 may be coupled to crankshaft 28 so that reciprocating motion of the piston is translated into rotational motion of the crankshaft. Crankshaft 28 may be coupled to at least one drive wheel of vehicle 10 via a transmission system. Further, a starter motor (not shown) may be coupled to crankshaft 140 via a flywheel to enable a starting operation of engine 12.

Combustion chamber 24 may receive intake air via a series of intake passages 32 and 36. Intake air passage 36 can communicate with other cylinders of engine 12 in addition to cylinder 24. In some examples, one or more of the intake passages may include a boosting device such as a turbocharger or a supercharger. Combustion chamber 24 may exhaust combustion gases via exhaust passage 38. Intake air passage 36 and exhaust passage 38 can selectively communicate with combustion chamber 24 via respective intake poppet valve 40 and exhaust poppet valve 42 located at an upper region of combustion chamber 24. In some embodiments, each cylinder of engine 12, including cylinder 24, may include two or more intake poppet valves and/or two or more exhaust poppet valves located at an upper region of the cylinder. A throttle 44 including a throttle plate 46 may be provided along an intake passage of the engine for varying the flow rate and/or pressure of intake air provided to the engine cylinders.

Intake valve 40 may be controlled by control system 14 via electric valve actuation (EVA) mediated by actuator 48. Likewise, exhaust valve 42 may be controlled by control system 104 via EVA mediated by actuator 50. During some conditions, engine controller 16 may vary the signals provided to controllers of intake valve 40 and/or exhaust valve 42 to control the opening and closing of the respective intake and exhaust valves. The position of intake valve 40 and exhaust valve 42 may be determined by respective valve position sensors (not shown). The valve actuators may be of the electric valve actuation type or cam actuation type, or a combination thereof. The intake and exhaust valve timing may be controlled concurrently, or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 16 to vary valve operation. For example, cylinder 24 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 24 can have a compression ratio, which is the ratio of volumes when piston 26 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 12 may include a spark plug 52 for initiating combustion. Ignition system 54 can provide an ignition spark to combustion chamber 24 via spark plug 52 in response to spark advance signal SA from controller 16, under select operating modes. However, in some embodiments, spark plug 52 may be omitted, such as where engine 12 may initiate combustion by auto-ignition or by injection of fuel, as may be the case with some diesel engines.

In some examples, each cylinder of engine 12 may be configured with one or more fuel injectors for providing fuel thereto. As a non-limiting example, cylinder 24 is shown including two fuel injectors 54 and 56. Fuel injectors 54 and 56 may be configured to deliver fuel received from fuel system 58. Fuel system 58 may include one or more fuel tanks, fuel pumps, and fuel rails. Fuel injector 54 is shown coupled directly to cylinder 24 for injecting fuel directly therein in proportion to the pulse width of signal FPW-1 received from controller 16 via electronic driver 60. In this manner, fuel injector 54 provides what is known as direct injection (hereafter referred to as "DI") of fuel into combustion cylinder 24. While FIG. 1 shows injector 54 positioned to one side of cylinder 24, it may alternatively be located overhead of the piston, such as near the position of spark plug 52. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 54 from a fuel tank of fuel system 58 via a high pressure fuel pump, and a fuel rail. Further, the fuel tank may have a pressure transducer providing a signal to controller 16.

Fuel injector 56 is shown arranged in intake passage 36, rather than in cylinder 24, in a configuration that provides what is known as port injection of fuel (hereafter referred to as "PFI") into the intake port upstream of cylinder 24. Fuel injector 56 may inject fuel, received from fuel system 58, in proportion to the pulse width of signal FPW-2 received from controller 16 via electronic driver 62. Note that a single driver 60 or 62 may be used for both fuel injection systems, or multiple drivers, for example driver 60 for fuel injector 54 and driver 62 for fuel injector 56, may be used, as depicted.

In an alternate example, each of fuel injectors 54 and 56 may be configured as direct fuel injectors for injecting fuel directly into cylinder 24. In still another example, each of fuel injectors 54 and 56 may be configured as port fuel injectors for injecting fuel upstream of intake valve 40. In yet other examples, cylinder 24 may include only a single fuel injector that is configured to receive different fuels from the fuel systems in varying relative amounts as a fuel mixture and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 24 in accordance with a calibrated split ratio. Further, the distribution and/or relative amount of fuel delivered from each injector (that is, the split ratio) may vary with operating conditions, such as engine load, engine temperature, knock, and exhaust temperature, as well as combustion event number as counted from a first combustion event since an engine start. The port injected fuel may be delivered during an open intake valve event, closed intake valve event (e.g., substantially before the intake stroke), as well as during both open and closed intake valve operation. As such, by delivering port injected fuel during a closed intake valve event, air-fuel mixture formation is improved (as compared to during open intake valve operation). Similarly, directly injected fuel may be delivered during an intake stroke as well as partly during a previous exhaust stroke and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 12 may include any suitable number of cylinders, including 2, 3, 4, 5, 6, 8, 10, 12, or more cylinders. Further, each of these cylinders can include some or all of the various components described and depicted by FIG. 1 with reference to cylinder 24.

Fuel injectors 54 and 56 may have different characteristics. These include differences in size, for example, one injector may have a larger injection hole than the other. Other differences include, but are not limited to, different spray angles, different operating temperatures, different targeting, different injection timing, different spray characteristics, different locations, etc. Moreover, depending on the distribution ratio of injected fuel among injectors 54 and 56, different effects may be achieved.

Fuel tanks in fuel system 58 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Exhaust passage 38 can receive exhaust gases from other cylinders of engine 12 in addition to cylinder 24. Exhaust gas sensor 64 is shown coupled to exhaust passage 38 upstream of emission control device 66. Sensor 64 may be selected from among various suitable sensors for providing an indication of exhaust gas air/fuel ratio, such as a linear oxygen sensor or UEGO (universal or wide-range exhaust gas oxygen); a two-state oxygen sensor or EGO (as depicted); a HEGO (heated EGO); or a NOx, HC, or CO sensor, for example. Emission control device 178 may be a three way catalyst (TWC), NOx trap, various other emission control devices, or combinations thereof.

Controller 16 may receive various signals from sensors coupled to engine 12 in addition to those signals previously discussed, including measurement of inducted mass air flow (MAF) from mass air flow sensor 68, absolute manifold pressure signal (MAP) from sensor 70, engine coolant temperature (ECT) from temperature sensor 72 coupled to cooling sleeve 74, and a profile ignition pickup signal (PIP) from Hall effect sensor 76 (or other type) coupled to crankshaft 28. Manifold pressure signal MAP from sensor 70 may be used to provide an indication of vacuum or pressure in the intake manifold. During stoichiometric operation, the MAP sensor can give an indication of engine torque. Further, this sensor, along with the detected engine speed, can provide an estimate of charge (including air) inducted into the cylinder. Controller 16 is shown in FIG. 1 as a microcomputer, including a microprocessor unit 80, input/output ports 82, an electronic storage medium for executable programs and calibration values shown as non-transitory read only memory chip 84 in this particular example for storing executable instructions, random access memory 86, keep alive memory 88, and a data bus.

Continuing with FIG. 1, crankshaft 28 may be coupled to at least one drive wheel of a vehicle via an intermediate transmission system. Further, rotation of crankshaft 28 may be applied to output shaft 114 to operate hydraulic pump 116 to create pressure in power steering system 118.

Vehicle 10 may be controlled by various vehicle operator input devices, including steering wheel 142. The steering wheel 142 and attached steering shaft 146, located in the steering column, transmit a vehicle operator's movement of the steering wheel to steering gear 148. The steering gear 148 changes the rotary motion of steering wheel 142 to linear motion that is applied to turn wheels 150 including tires 152. In the illustrated example, the steering gear is a rack-and-pinion configuration that includes a tubular housing 154 containing toothed rack 156 and pinion gear 158. The tubular housing 154 is mounted rigidly to the vehicle body or frame to take the reaction to the steering effort. The pinion gear 158 is attached to the lower end of steering shaft 146, which translates the motion of steering wheel 142, and meshes with teeth of rack 156. Tie rods 160 connect the ends of rack 156 to steering-knuckle arms 162 via ball joints 164 that include bushings 166. Further, steering-knuckle arms 162 couple to wheels 150. Accordingly, as steering wheel 142 rotates, pinion gear 158 moves rack 156 right or left, which causes tie rods 160 and steering-knuckle arms 162 to turn wheels 150 and tires 152 in or out for steering. Alternatively, in some embodiments, a recirculating-ball steering configuration may be employed.

Power steering system 118 is provided to assist in turning wheels 150 and tires 152 based on rotation of steering wheel 142 by the vehicle operator. Power steering system 118 includes hydraulic pump 116 mounted to output shaft 114 of engine 12 via belt 168. The output shaft 114 may be an accessory drive of engine 12.

Operation of hydraulic pump 116 causes power steering fluid to flow at high pressure into tubular housing 154 via pressure hose 132. Rotation of steering wheel 142 causes the pressurized fluid to be directed one way or the other to assist in moving rack 156. Hydraulic fluid flows out of tubular housing 154 into reservoir 170 via return hose 134. Further, reservoir 170 is coupled to hydraulic pump 116 via suction hose 136 to form a closed system. A cooler 138 may be coupled to return hose 134 to enable cooling of power steering fluid prior to the fluid returning to reservoir 170. For example, cooler 138 may be a "tube" type cooler or may be a "tank" type cooler, similar to a radiator. As described further herein with regard to FIG. 2, cooling airflow generated by an engine cooling fan may be utilized by cooler 138 in exchanging heat from the power steering fluid therein. In some embodiments, the hydraulic pump may be driven by an electric motor instead of the engine output shaft. In some embodiments, an electric power steering system may be employed without a hydraulic system. In particular, sensors may detect the motion and torque of the steering column, and a computer module may apply assistive power via an electric motor coupled directly to either the steering gear or steering column.

A steering wheel angle (SWA) sensor 172 may be coupled to steering wheel 142 to provide a relative SWA signal to control system 14. That is, the relative SWA signal provides an indication of an angle of steering wheel 142 relative to center or relative to an angle of the steering wheel detected at vehicle startup. In some examples, an absolute SWA may be output by SWA sensor 172, or an absolute SWA may be determined based on the relative SWA signal.

The wheel speed sensor 174 may be located in a suitable position to sense the speed or rotational position of wheels 150 and may send a wheel speed signal (WS) to control system 14. A wheel position sensor 176 may be located in a suitable position to sense the yaw position or rotation of wheels 150 and may send a yaw position signal (YAW) to control system 14. In one example, wheel position sensor 176 is located proximate to ball joints 164 to detect rotation of steering-knuckle arms 162. In some embodiments, the wheel speed sensor and the wheel position sensor may be integrated in a brake control module (not shown). The relative steering wheel angle, wheel speed, and/or YAW signals may be utilized by control system 14 for electronic stability control (ESC), brake control, or the like. Moreover, the signals may be utilized by control system 14 to adjust engine operations to compensate for variations in power steering pump temperature as will be discussed in further detail below with reference to FIGS. 4-6.

Figure 2:
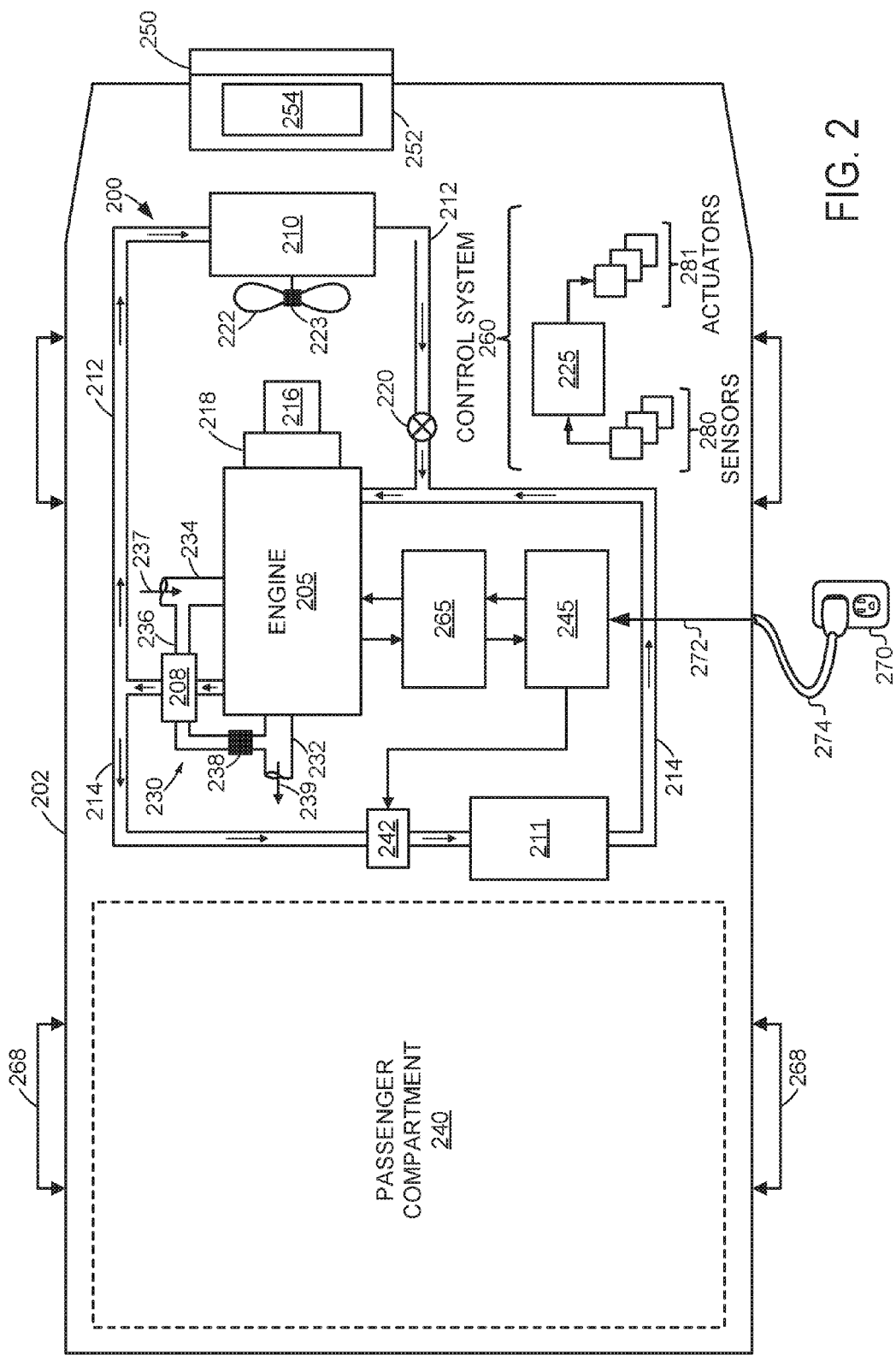
FIG. 2 schematically shows an example vehicle propulsion system including an engine cooling system.

Turning now to FIG. 2, an example embodiment of a cooling system 200 in a motor vehicle 202 is illustrated schematically. Motor vehicle 202 may be an example of vehicle system 10. Cooling system 200 circulates coolant through internal combustion engine 205 and through exhaust gas recirculation (EGR) cooler 208 to absorb waste heat and distributes the heated coolant to radiator 210 and/or heater core 211 via coolant lines 212 and 214, respectively.

In particular, FIG. 2 shows cooling system 200 coupled to engine 205 and circulating engine coolant from engine 205 through EGR cooler 208 and to radiator 210 via engine-driven coolant pump 216 and back to engine 205 via coolant line 212. Engine-driven coolant pump 216 may be coupled to the engine via front end accessory drive (FEAD) 218 and rotated proportionally to engine speed via belt, chain, etc. Specifically, engine-driven coolant pump 216 circulates coolant through passages in the engine block, head, etc., to absorb engine heat, which is then transferred via the radiator 210 to ambient air. In an example where pump 216 is a centrifugal pump, the pressure (and resulting flow) produced may be proportional to the crankshaft speed, which in the example of FIG. 1, is directly proportional to engine speed. The temperature of the coolant may be regulated by a thermostat valve 220 located in the cooling line 212, which may be kept closed until the coolant reaches a threshold temperature.

Further, cooling fan 222 may be coupled to radiator 210 in order to maintain an airflow through radiator 210 when vehicle 202 is moving slowly or stopped while the engine is running. In some examples, fan activation status and/or fan speed may be controlled by controller 225 based on engine coolant temperature, engine load, engine oil temperature, cylinder head temperature, transmission temperature, vehicle speed, ambient temperature, etc. For example, an engine coolant temperature sensor may indicate an engine coolant temperature to the controller. Upon the engine coolant temperature increasing above a threshold, the controller may command the engine cooling fan to turn on at a predetermined speed and/or a speed that is based on one or more engine operating conditions. Such a cooling airflow may then be utilized by radiator 210 and other under-hood components (e.g., fuel system components, power steering system, etc.) to keep the engine and/or transmission cool.

Cooling fan 222 may be coupled to battery driven motor 223. During engine operation, the engine generated torque may be transmitted to an alternator (not shown) along a drive shaft (not shown), which may then be used by the alternator to generate electrical power. The electrical power may be stored in an electrical energy storage device, such as system battery 245. The battery may then be used to activate electric cooling fan motor 223 via relays (not shown). Thus, operating the cooling fan system may include electrically powering cooling fan rotation from engine rotational input, through the alternator and system battery 245. In other embodiments, the cooling fan may be operated by enabling a variable speed electric motor coupled to the cooling fan. In still other embodiments, cooling fan 222 may be mechanically coupled to engine 205 via a clutch (not shown), and operating the cooling fan may include mechanically powering its rotation from engine rotational output via the clutch. While this embodiment depicts one cooling fan, other examples may use two or more cooling fans. Alternatively, fan 222 may be coupled to engine-driven coolant pump 216.

As shown in FIG. 2, engine 205 may include an exhaust gas recirculation (EGR) system 230. EGR system 230 may route a desired portion of exhaust gas from exhaust manifold 232 through EGR passage 236 to intake manifold 234, where the routed exhaust gas may be combined with intake air 237. The amount of EGR provided to intake manifold 234 may be varied by controller 225 via EGR valve 238. Further, an EGR sensor (not shown) may be arranged within EGR passage 236 and may provide an indication of one or more of pressure, temperature, and concentration of the exhaust gas. Alternatively, the EGR may be controlled based on an exhaust oxygen sensor and/or and intake oxygen sensor. Under some conditions, EGR system 230 may be used to regulate the temperature of the air and fuel mixture within the combustion chamber. EGR system 230 may further include EGR cooler 208 for cooling exhaust gas 239 being reintroduced to engine 205. In such an embodiment, coolant leaving engine 205 may be circulated through EGR cooler 208 before moving through coolant line 212 to radiator 210.

After passing through EGR cooler 208, coolant may flow through coolant line 212, as described above, and/or through coolant line 214 to heater core 211, where the heat may be transferred to passenger compartment 240, and back to engine 205. In some examples, engine-driven coolant pump 216 may operate to circulate the coolant through both coolant lines 212 and 214. In other examples, such as the example of FIG. 2 in which vehicle 202 has a hybrid-electric propulsion system, an electric auxiliary pump 242 may be included in the cooling system in addition to the engine-driven coolant pump. As such, auxiliary pump 242 may be employed to circulate coolant through heater core 211 during occasions when engine 205 is off (e.g., electric only operation) and/or to assist engine-driven coolant pump 216 when the engine is running, as will be described in further detail below. Like engine-driven coolant pump 216, auxiliary pump 242 may be a centrifugal pump; however, the pressure (and resulting flow) produced by auxiliary pump 242 may be proportional to an amount of power supplied to the pump by energy storage device 245.

Motor vehicle 202 may further include a grille 250 providing an opening (e.g., a grille opening, a bumper opening, etc.) for receiving airflow through or near the front end of the vehicle and into the engine compartment. Such airflow may then be utilized by radiator 210 and other components to keep the engine and/or transmission cool. Further, the airflow may reject heat from the vehicle air conditioning and can improve the performance of turbo charged/super charged engines equipped with intercoolers that reduce the temperature of the air going into the intake manifold/engine. Other under hood components (fuel system, batteries, fuel vapor canister, etc.) may also benefit from the cooling airflow. Thus, grille shutter system 252 may assist cooling system 200 in cooling internal combustion engine 205. Grille shutter system 252 comprises one or more grille shutters 254 configured to adjust the amount of airflow received through grille 250.

Grille shutters 254 are operable between an opened position and a closed position and may be maintained at either position or a plurality of intermediate positions thereof. In other words, opening of grille shutters 254 may be adjusted such that grille shutters 254 are opened partially, closed partially, or cycled between an opened position and a closed position to provide airflow for cooling engine compartment components at the least loss in fuel economy. This is because closing and/or partially closing grille shutters 254 reduces an amount of airflow received through grille 250, thus reducing the aerodynamic drag on the vehicle.

In some embodiments, control system 260 may be configured to adjust opening of grille shutters 254. Adjusting opening of grille shutters 254 may include opening one or more of the grille shutters, closing one or more of the grille shutters, partially opening one or more of the grille shutters, partially closing one or more of the grille shutters, adjusting opening and closing timing, etc. As an example, controller 225 may be communicably connected to grille shutter system 252 and may have instructions stored thereon to adjust opening of grille shutters 254.

Further, grille shutter system 252 may be adjusted during a non-driven vehicle condition. Thus, adjusting opening of one or more of the grille shutters 254 can be in response to a non-driven vehicle condition. The non-driven vehicle condition may be a deceleration condition, a braking condition, a tip-out condition, a combination thereof, or another type of condition signaling that a non-driven vehicle condition is occurring or about to occur. For example, an automatic cruise control braking signal may also be used. Further still, global positioning signals may be used indicating a slower region ahead, a downgrade approaching, etc.

In this example embodiment, the hybrid propulsion system includes an energy conversion device 265, which may include a motor, a generator, among others and combinations thereof. The energy conversion device 265 is further shown coupled to an energy storage device 245, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 268, engine 205 (e.g., provide a motor operation), auxiliary pump 242, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 225 (described below).

From the above, it should be understood that the exemplary hybrid-electric propulsion system is capable of various modes of operation. In a full hybrid implementation, for example, the propulsion system may operate using energy conversion device 265 (e.g., an electric motor) as the only torque source propelling the vehicle. This "electric only" mode of operation may be employed during braking, low speeds, while stopped at traffic lights, etc. In another mode, engine 205 is turned on, and acts as the only torque source powering drive wheel 268. In still another mode, which may be referred to as an "assist" mode, the hybrid propulsion system may supplement and act in cooperation with the torque provided by engine 205. As indicated above, energy conversion device 265 may also operate in a generator mode, in which torque is absorbed from engine 205 and/or the vehicle transmission. Furthermore, energy conversion device 265 may act to augment or absorb torque during transitions of engine 205 between different combustion modes (e.g., during transitions between a spark ignition mode and a compression ignition mode).

Energy storage device 245 may periodically receive electrical energy from a power source 270 residing external to the vehicle (e.g. not part of the vehicle) as indicated by arrow 272. As a non-limiting example, vehicle system 202 may be configured as a plug-in hybrid electric vehicle (PHEV), whereby electrical energy may be supplied to energy storage device 245 from power source 270 via an electrical energy transmission cable 274. During a recharging operation of energy storage device 245 from power source 270, electrical energy transmission cable 274 may electrically couple energy storage device 245 and power source 270. While the vehicle propulsion system is operated to propel the vehicle, electrical energy transmission cable 274 may be disconnected between power source 270 and energy storage device 245. Control system 260 may identify and/or control the amount of electrical energy stored at the energy storage device, which may be referred to as the state of charge (SOC). Power source 270 may comprise a part of an electrical grid.

In other embodiments, electrical transmission cable 274 may be omitted, where electrical energy may be received wirelessly at energy storage device 245 from power source 270. For example, energy storage device 245 may receive electrical energy from power source 270 via one or more of electromagnetic induction, radio waves, and electromagnetic resonance. As such, it should be appreciated that any suitable approach may be used for recharging energy storage device 245 from a power source that does not comprise part of the vehicle. In this way, a motor may propel the vehicle by utilizing an energy source other than the fuel utilized by engine 205.

The control system 260 receives signals from the various sensors 280 of FIG. 2 and/or the various sensors of FIG. 1, and employs the various actuators 281 of FIG. 2 to adjust engine operation based on the received signals and instructions stored on a memory of the controller. For example, engine cooling fan operation may be adjusted in response to steering wheel angle and engine speed, as described with reference to FIGS. 3 and 4. Further, engine speed may be adjusted based on inferred power steering fluid temperature, as described with reference to FIGS. 4-6.

As described above, hydraulic power steering systems generate heat during operation. The primary contributing factors to power steering overheating are engine speed (i.e., engine RPM) and steering wheel angle. While a cooler may be added to the power steering fluid circuit (e.g., cooler 138), airflow across the cooler is needed to drive heat exchange for the power steering fluid. In scenarios where the engine speed is high but vehicle speed is low, airflow into the engine compartment may be limited. If the steering wheel is also turned significantly (e.g., during a low gear uphill climb on a winding mountain road), the power steering system may overheat. By activating engine cooling fans in response to conditions likely to generate heat within the power steering system, such overheating may be delayed and/or mitigated.

FIG. 3 shows a graph 300, illustrating power steering fluid temperature over time for engine systems operated at a constant speed and with a constant steering wheel angle. In this example, engines were operated at 3500 RPM and a steering wheel angle of 85% of maximum steering wheel angle. Graph 300 includes plot 302, indicating the temperature of the power steering fluid without the engine cooling fan activated, and plot 304, indicating the temperature of the power steering fluid with the engine cooling fan activated at 304. Furthermore, dashed line 306 represents a first temperature threshold (200° F.) for power steering system overheating, while dashed line 308 represents a second temperature threshold (250° F.) for power steering system overheating.

In both engine systems, heat is generated in the power steering system, causing the temperature of the steering fluid to increase over time from time $t_0$, as shown in plots 302 and 304. Without cooling fan intervention, at $t_1$, the temperature of the power steering fluid (plot 302) surpasses the temperature threshold for power steering system overheating (represented dashed line 306). With cooling fan intervention, the temperature of the power steering fluid (plot 304) does not surpass temperature threshold 306 until $t_2$, thereby delaying hydraulic power steering system overheating. Further, with cooling fan intervention, the power steering fluid has a reduced maximum temperature. While the power steering system may operate for brief periods at temperatures above 200° F. without causing significant damage, operation at or above 250° F. for any duration may result in degradation of the power steering system. Targeted cooling fan operation may thus be utilized to prevent high-temperature power steering operation, and to extend the operational life of the power steering system.

As described above, engine cooling fans may not be activated at all times where the conditions for power steering fluid overheating are met. Cooling fans may be activated by increases in engine coolant and/or engine oil temperature, but these temperature profiles do not necessarily correlate with the temperature of steering fluid. While some power steering systems include a steering fluid temperature sensor, the addition of a dedicated temperature sensor to the power steering system increases the manufacturing costs of the vehicle. Further, the output of such a valve or sensor may lag behind the real-time temperature of the hydraulic fluid.

FIG. 4 depicts a flow chart for a high level method 400 for controlling an engine cooling fan based on engine speed and steering wheel angle in order to prevent overheating of a vehicle power steering system. Instructions for carrying out method 400 and other methods included herein may be executed by a controller based on instructions stored in non-transitory memory of the controller and in conjunction with signals received from sensors of the engine system, such as the sensors described above with reference to FIGS. 1 and 2. The controller may employ actuators of the engine cooling system to adjust engine cooling system operation according to the methods described below. While described with reference to the systems depicted in FIGS. 1 and 2, it should be understood that method 400 or similar methods may be applied to other systems without departing from the scope of this disclosure.

Method 400 begins at 405 and includes evaluating operating conditions. Operating conditions may comprise one or more vehicle conditions, one or more engine conditions, one or more steering system conditions, and/or other conditions. For example, operating conditions may include, but are not limited to, engine speed, engine load, fuel tank fill level, ambient temperature, engine operating status, vehicle location (as determined through an on-board GPS, for example), etc. Operating conditions may be measured by one or more sensors coupled to a controller or may be estimated or inferred based on available data.

Continuing at 410, method 400 includes monitoring an angle of a steering wheel over time while the vehicle is being operated. For example, a vehicle controller may sample the output of a steering wheel angle sensor, such as steering wheel sensor 172, as described with regard to FIG. 1. The sampling rate of the sensor may be predetermined or may be based on operating conditions. For example, the sampling rate may be increased based on vehicle operation duration and/or other indicators that the power steering system has increased in temperature over a baseline or threshold temperature. In some examples, steering wheel angle may be inferred based on other information, such as wheel position, vehicle trajectory, etc. Steering wheel angle may be recorded at the vehicle controller. In some examples, a predetermined number of samples may be stored in a first-in, first-out buffer. In some examples, steering wheel angle may be stored as an average and/or weighted average over time. In some examples, steering wheel angle may be integrated over time at the controller.

Continuing at 415, method 400 includes monitoring an engine speed over time while the vehicle is being operated. For example, a vehicle controller may sample the output of a crankshaft rotational speed sensor, engine speed sensor, or other on board sensor(s). The sampling rate of the sensor may be predetermined or may be based on operating conditions. In some examples, engine speed may be inferred based on other available information. For hybrid vehicles, and other vehicles configured to operate in an engine-off mode, engine speed may not be recorded during periods where the engine is not combusting fuel. Engine speed may be recorded at the vehicle controller. In some examples, a predetermined number of samples may be stored in a first-in, first-out buffer. In some examples, engine speed may be stored as an average and/or weighted average over time. In some examples, engine speed may be integrated over time at the controller.

Continuing at 420, method 400 includes determining whether the steering wheel angle is greater than a first threshold, whether the engine speed is greater than a second threshold, and whether the first and second thresholds have been exceeded for a duration. In other words, a controller may determine whether both steering wheel angle and engine speed have been greater than their respective thresholds for a length of time. Both the thresholds and the duration may be predetermined or may be based on current operating conditions. In some examples, engine speed and steering wheel angle may be combined into a single index (e.g., by multiplying the two values) and the index compared to a threshold. As one example, the engine speed threshold may be set at 3000 RPM but may be higher or lower in other examples and may be adjusted based on operating condition in some embodiments. As an example, the steering wheel angle threshold may be set at 80% of a maximum angle. As per the engine speed threshold, the steering wheel angle threshold may be higher or lower in other examples and may be adjusted based on operating conditions in some embodiments. The duration may be set at 5 seconds in some examples but may be higher or lower in some embodiments.

If the steering wheel angle and/or the engine speed are not above their respective threshold for the duration, method 400 proceeds to 425. At 425, method 400 includes maintaining the current engine cooling fan logic. For example, activation of the engine cooling fan and the resulting fan speed may be determined based on the engine coolant temperature. If, for example, the coolant temperature exceeds a first, lower threshold, the engine cooling fan speed may be increased to initiate cooling. Exceeding a second, higher temperature threshold may further increase fan speed. Fan speed may also depend on other factors like engine oil temperature, cylinder head temperature, engine load, etc. In another example, the fan may be activated if the temperature of the transmission reaches a temperature threshold. The opening and closing of grille shutters may also be regulated by current logic. For example, grille shutters may be opened in anticipation of cooling fan activation. In some examples, grille shutters may be opened while cooling fans are maintained off, such as when engine and/or vehicle speeds exceed a threshold. Method 400 may then end.

If the steering wheel angle and the engine speed are above their respective thresholds for the duration, method 400 proceeds to 430. At 430, method 400 includes overriding the current engine cooling fan logic and adjusting fan operation. For example, the engine cooling fan (e.g., cooling fan 222 of FIG. 2) may be activated and set to a desired operating speed (e.g., 80% of the maximum speed) independent of the engine coolant temperature. If the engine fan is operated by a battery driven motor (such as cooling fan motor 223 of FIG. 2), activating the engine fan may include energizing the motor at a voltage required to reach the desired operating speed. If the engine fan is mechanically coupled to the engine via a clutch, activating the cooling fan may include mechanically powering its rotation from engine rotational output via the clutch. In some examples, the cooling fan may already be activated (that is, on) but at a lower rotational speed than specified by the calibration described herein. If the cooling fan is on but at a lower rotational speed, the speed will be increased to the desired operating speed.

Continuing at 435, method 400 includes maintaining engine cooling fan operation for a duration. For example, a fan timer may be started and the fan "on" duration calculated based on the inferred temperature of the power steering fluid, which is calculated as a function of engine speed and steering wheel angle. As another example, the fan may be kept on while the engine speed and steering wheel angle thresholds (e.g., the thresholds described in step 420) are met plus an additional duration, which may be a fixed duration or may be calculated based on the amount of time that the thresholds were exceeded. The duration of cooling fan activation may be further based on other operating conditions. For example, if the engine coolant temperature decreases below a threshold, the cooling fan active duration may be decreased, and/or the cooling fan speed may be decreased for the remainder of the duration. If the engine speed and/or steering wheel angle decrease below the thresholds described at 420, the duration may be decreased. Grille shutters may be opened (or maintained open) for the duration at a degree of opening that is predetermined or based on current operating condition, then closed or returned to a previous conformation following the duration.

Continuing at 440, method 400 includes determining whether the steering wheel angle is greater than a threshold and whether the engine speed is greater than a threshold following the cooling fan operation duration. The thresholds may be the same thresholds described at 420, or one or more of the thresholds may have different values. If the steering wheel angle and engine speed are not above their respective thresholds, method 400 proceeds to 445. At 445, method 400 includes reverting to the prior engine cooling fan logic (e.g., as described at 425). In other words, the engine cooling fan logic override will cease. The cooling fan may be turned off, though in some scenarios the cooling fan may be maintained on if the prevailing cooling fan logic dictates as such. Following 445, method 400 ends.

If the steering wheel angle and engine speed are above their respective thresholds, method 400 proceeds to 450. At 450, method 400 may optionally include regulating the engine speed to reduce power steering fluid temperature, as described in detail with reference to FIG. 6. That is, activation of the engine cooling fan to reduce power steering fluid temperature may be used alone or in combination with a method for regulating engine speed to reduce power steering fluid temperature. Following 450, method 400 ends.

As described with regard to FIG. 4, certain operating conditions may dictate the reduction of engine speed as an alternative to, or in addition to operation of the engine cooling fans. With the operation of cooling fans, the temperature of the power steering fluid may increase more slowly, as shown in FIG. 3. However, if the engine speed is decreased, the power steering fluid temperature may also decrease, thus preventing critical temperature thresholds from being reached.

Turning now to FIG. 5, a graphical representation of an additional power steering fluid cooling strategy that includes reducing engine speed is shown. Specifically, graph 500 shows how engine speed may be reduced based on a power steering fluid temperature index. Engine speed thresholds ($n_{limit}$) as well as maximum ($n_{redline}$) and minimum ($n_{minimum}$) engine speeds are indicated by horizontal dashed lines. Power steering fluid temperature index thresholds ($T_1$-$T_5$) are indicated by vertical dashed lines. In this example, the power steering fluid temperature index may be considered a single value which incorporates both engine speed and steering wheel angle (i.e., an inferred power steering fluid temperature) and may further incorporate time spent at or above engine speed and/or steering wheel angle thresholds.

Section 502 illustrates how engine speed may be reduced in a step-wise fashion to reduce power steering fluid temperature for an engine where the steering wheel angle and engine speed have been at or above threshold values for a duration, as described with regard to FIG. 4. For example, if the engine is operated at a high speed ($n_{redline}$) and the power steering fluid temperature index reaches threshold $T_2$, the engine speed may be reduced to (e.g., to $n_{limit2}$). If this results in the power steering fluid temperature index (e.g., to $T_1$), the engine speed limit may be lifted. If reducing engine speed does not prevent the power steering fluid temperature index from increasing (e.g., to $T_3$), the engine speed may again be reduced (e.g., to $n_{limit3}$). This process may be repeated until the power steering fluid temperature index reaches an upper threshold (e.g., to $T_5$).

Section 504 illustrates how engine speed may be actively pushed down. Line 506 indicates an engine condition wherein the engine speed is decreased until a minimum engine speed limit is reached (e.g., $n_{minimum}$). In this example, the power steering fluid temperature index does not decrease responsive to the active pushdown, and engine speed is maintained at the minimum speed. However, line 508 indicates an engine condition where the decrease in engine speed results in a plateauing of the power steering fluid temperature index. Engine speed may then be increased, provided no additional increase in the power steering fluid temperature index is realized.

FIG. 6 depicts a flow chart for a high level method 600 for limiting an engine speed based on a steering wheel angle and/or a power steering fluid temperature index in order to prevent overheating of a vehicle power steering system. Instructions for carrying out method 600 and other methods included herein may be executed by a controller based on instructions stored in non-transitory memory of the controller and in conjunction with signals received from sensors of the engine system, such as the sensors described above with reference to FIGS. 1 and 2. The controller may employ actuators of the engine system to adjust engine operation according to the methods described below. While described with reference to the systems depicted in FIGS. 1 and 2, it should be understood that method 600 or similar methods may be applied to other systems without departing from the scope of this disclosure.

Method 600 begins at 605 and includes evaluating operating conditions. Operating conditions may comprise one or more vehicle conditions, one or more engine conditions, one or more steering system conditions, and/or other conditions. For example, operating conditions may include, but are not limited to, engine speed, engine load, fuel tank fill level, ambient temperature, engine operating status, steering wheel angle, vehicle location (as determined through an on-board GPS, for example), etc. Operating conditions may be measured by one or more sensors coupled to a controller or may be estimated or inferred based on available data.

Continuing at 610, method 600 includes determining whether a power steering cooling routine has been triggered. For example, a vehicle controller may determine whether a power steering cooling routine, such as the cooling routine described with regard to FIG. 4, has been initiated. In some examples, determining whether a power steering cooling routine has been triggered may include determining whether entry conditions for such a routine have been met. As an example, this may include determining whether engine speed and steering wheel angle have increased above respective thresholds. Determining whether a power steering cooling routine has been triggered may include determining whether engine cooling fans have been activated based on engine speed and steering wheel angle conditions and/or whether engine cooling fan logic has been overridden based on engine speed and steering wheel angle conditions.

If a power steering cooling routine has not been triggered, method 600 proceeds to 615. At 615, method 600 includes maintaining current engine operations. For example, engine speed may be maintained based on current engine control logic. Other engine operating parameters, such as A/F ratio, firing sequence, compression ratio, etc. may also be maintained based on the current engine control logic. Further, engine cooling system operations may be maintained based on the current engine cooling system control logic. Method 600 then ends.

If a power steering cooling routine has been triggered, method 600 proceeds to 620. At 620, method 600 includes determining whether engine speed and steering wheel angle thresholds have been exceeded for a first duration. The first duration may be predetermined or based on current operating conditions. As one example, the first duration may be set to 15 seconds, though a higher or lower duration may be used in some examples. In some embodiments, other signifiers of power steering fluid temperature, such as a power steering fluid temperature index, as described with regard to FIG. 5 may be evaluated against a threshold in addition to or as an alternative to steering wheel angle and engine speed. If the engine speed and steering wheel angle thresholds have not been exceeded for the first duration, method 600 proceeds to 625 and includes maintaining the current engine speed. Method 600 then ends.

If the engine speed and steering wheel angle thresholds have been exceeded for the first duration, method 600 then proceeds to 630. At 630, method 600 includes reducing the engine speed to a first predetermined engine speed. For example, FIG. 5 shows a reduction in engine speed from $n_{redline}$ to $n_{limit2}$ upon the power steering fluid temperature index increasing above threshold $T_2$. In examples where the power steering cooling routine is triggered by engine speed being above a threshold for a duration, the engine speed may be reduced to a first predetermined engine speed that is less than the threshold engine speed. The first predetermined engine speed may be predetermined, or may be based on current operating conditions, such as engine load, vehicle speed, etc. For instance, in examples where the power steering cooling routine is triggered by engine speed being above 3000 RPM for a duration, the first predetermined engine speed may be less than 3000 RPM, for example 2500 RPM.

Upon reducing engine speed to the first predetermined engine speed, method 600 proceeds to 635. At 635, method 600 includes determining whether engine speed and steering wheel angle thresholds have been exceeded for an intermediate duration, the intermediate duration being longer than the first duration described at 620. The intermediate duration may be predetermined or based on current operating conditions. As one example, if the first duration is set to 15 sec, the intermediate duration may be set to 20 sec. If the engine speed and steering wheel angle thresholds have not been exceeded for the intermediate duration, method 600 proceeds to 625 and includes maintaining the current engine speed. Method 600 then ends.

If the engine speed and steering wheel angle thresholds have been exceeded for the intermediate duration, method 600 then proceeds to 640. At 640, method 600 includes reducing the engine speed to an intermediate predetermined engine speed. For example, FIG. 5 shows a reduction in engine speed from $n_{limit2}$ to $n_{limit3}$ upon the power steering fluid temperature index increasing above threshold $T_3$. As such, the engine speed may be reduced to an intermediate predetermined engine speed that is less than the first predetermined engine speed and less than the threshold engine speed. The intermediate predetermined engine speed may be predetermined, or may be based on current operating conditions, such as engine load, vehicle speed, etc. As an example, in examples where the first predetermined engine speed is 2500 RPM, the intermediate predetermined engine speed may be set equal to 2100 RPM.

Upon reducing engine speed to the intermediate predetermined engine speed, method 600 proceeds to 645. At 645, method 600 includes determining whether engine speed and steering wheel angle thresholds have been exceeded for a maximum duration, the maximum duration being longer than the intermediate duration described at 635. The maximum engine duration may be predetermined or based on current operating conditions. As one example, if the first duration is set to 15 sec, the maximum duration may be set to 30 sec.

If the engine speed and steering wheel angle thresholds have not been exceeded for the maximum duration, method 600 then proceeds to 635. At 635, method 600 includes determining whether the engine speed and steering wheel angle thresholds have been exceeded for an intermediate duration. In some examples, multiple intermediate durations may be placed between the first duration and the maximum duration. For example, intermediate durations may be set at 20 sec, 24 sec, and 28 sec. As shown in FIG. 5, the power steering fluid temperature index may increase above threshold $T_4$ (an intermediate threshold) prior to reaching threshold $T_5$ (maximum threshold). If the engine speed and steering wheel angle thresholds have been exceeded for an intermediate duration, the engine speed may be iteratively reduced to a predetermined engine speed correlating with that particular duration. If the steering wheel angle and/or power steering fluid temperature index is decreasing or not being maintained above the threshold, method 600 proceeds to 625 and includes maintaining the engine speed. Method 600 then ends.

If the engine speed and steering wheel angle thresholds have been exceeded for the maximum duration, method 600 then proceeds to 650. At 650, method 600 includes actively pushing down the engine speed until either the steering wheel angle and/or the power steering fluid temperature index stops increasing and/or the engine speed decreases to a minimum speed threshold. For example, as shown in FIG. 5, engine speed may be gradually reduced from $n_{limit4}$ towards $n_{minimum}$. If the power steering fluid temperature index stops increasing or decreases, the engine speed may be held at the speed at which this index change occurs. Else, the engine speed may be held at a minimum threshold ($n_{minimum}$). In this way, the influence of engine speed on power steering system temperature may be reduced within engine operating parameters. Method 600 may then end.

FIG. 7 depicts an example timeline 700 for operating a vehicle engine and engine cooling system according to the methods described herein and with regard to FIGS. 4 and 6. Timeline 700 includes plot 710, indicating engine speed (in RPM) over time. Line 711 represents a threshold engine speed for initiating a power steering system cooling routine. Line 713 represents a first predetermined engine speed. Line 715 represents a first intermediate predetermined engine speed. Line 717 represents a second intermediate predetermined engine speed. Line 719 represents a minimum engine speed threshold. Timeline 700 further includes plot 720, indicating a steering wheel angle over time. Timeline 700 further includes plot 730, indicating an engine cooling fan status over time, and plot 740, indicating duration that the steering wheel angle (SWA) is above a threshold over time. Line 741 represents a first duration. Line 743 represents a first intermediate duration. Line 745 represents a second intermediate duration. Line 747 represents a maximum duration.

At time $t_0$, the engine speed, as indicated by plot 710, is below the threshold for initiating a power steering system cooling routine represented by line 711, and the steering wheel angle, indicated by plot 720, is below the threshold for initiating a power steering system cooling routine represented by line 725. As such, the engine cooling fan is off, as indicated by plot 730. At time $t_1$, the engine speed increases above the threshold represented by line 711. However, the steering wheel angle is below the threshold represented by line 725, and hence the engine cooling fans remain off. The steering wheel angle increases above the threshold represented by line 725 at time $t_2$, however the cooling fans remain off until time $t_3$, when both the engine speed and steering wheel angle have been above their respective thresholds for a duration. The cooling fans are activated from time $t_3$ to time $t_4$, and then turned off. The cooling fans are once again activated at time $t_5$, at which point the engine speed and steering wheel angle have again been above their respective thresholds for a duration.

At time $t_6$, the steering wheel angle has been above its threshold for the first duration represented by line 741. As such, the engine speed is reduced until time $t_7$, when the engine speed reaches the first intermediate predetermined engine speed indicated by line 715. Cooling fans remain activated, even though the engine speed is below the threshold represented by line 711. At time $t_8$, steering wheel angle has been above its threshold for the first intermediate duration represented by line 743. As such, the engine speed is reduced until time $t_9$, when the engine speed reaches the first intermediate predetermined engine speed indicated by line 715. At time $t_{10}$, steering wheel angle has been above its threshold for the second intermediate duration represented by line 745. As such, the engine speed is reduced until time $t_{11}$, when the engine speed reaches the second intermediate predetermined engine speed indicated by line 717. At time $t_{12}$, steering wheel angle has been above its threshold for the maximum duration represented by line 747. As such, the engine speed is actively pushed down until time $t_{13}$, when the engine speed reaches the minimum engine speed threshold indicated by line 719.

The systems described herein and with reference to FIGS. 1 & 2, along with the methods described herein and with reference to FIGS. 4 and 6 may enable one or more systems and one or more methods. In one example, a method is presented comprising: adjusting operation of an engine cooling fan based on an engine speed and a steering wheel angle; and operating the engine cooling fan for a duration. The technical effect of implementing this method is a reduction in power steering overheating without relying on a power steering fluid temperature sensor. In such an example, adjusting operation of an engine cooling fan based on an engine speed may additionally or alternatively comprise adjusting operation of the engine cooling fan based on an engine speed greater than an engine speed threshold for a first predetermined duration. In any of the preceding example methods, adjusting operation of an engine cooling fan based on a steering wheel angle may additionally or alternatively comprise adjusting operation of the engine cooling fan based on a steering wheel angle greater than a steering wheel angle threshold for the first predetermined duration. In any of the preceding example methods, the method may additionally or alternatively comprise reducing an engine speed based on an engine speed greater than the engine speed threshold for a second predetermined duration, longer than the first predetermined duration, and further based on a steering wheel angle being greater than the steering wheel angle threshold for the second predetermined duration. In any of the preceding example methods, reducing an engine speed may additionally or alternatively comprise reducing an engine speed to a first predetermined engine speed, less than the threshold engine speed. In any of the preceding example methods, the method may additionally or alternatively comprise following reducing engine speed to the first predetermined engine speed, reducing engine speed to an intermediate predetermined engine speed, lower than the first predetermined engine speed based on a steering wheel angle being greater than the steering wheel angle threshold for an intermediate predetermined duration. In any of the preceding example methods, the method may additionally or alternatively comprise following reducing engine speed to the intermediate predetermined engine speed, actively pushing down engine speed based on steering wheel angle being greater than the steering wheel angle threshold for a maximum predetermined duration. In any of the preceding example methods, the method may additionally or alternatively comprise ceasing actively pushing down engine speed responsive to reaching a minimum engine speed. In any of the preceding example methods, the method may additionally or alternatively comprise ceasing actively pushing down engine speed responsive to steering wheel angle plateauing or decreasing. In any of the preceding example methods, adjusting operation of an engine cooling fan may additionally or alternatively not be based on a temperature of a power steering fluid. In any of the preceding example methods, operating the engine cooling fan for a duration may additionally or alternatively comprise operating the engine cooling fan at a predetermined speed for a duration based on the steering wheel angle and the engine speed. In any of the preceding example methods, operating the engine cooling fan for a duration may additionally or alternatively comprise overriding a current engine cooling fan operation logic for the duration. In any of the preceding example methods, the method may additionally or alternatively comprise reverting control of the engine cooling fan to a previous engine cooling fan operation logic following the duration.

In another example, a system for an engine is presented, comprising: an engine cooling system including at least one engine cooling fan; a steering wheel coupled to a hydraulic power steering system including a power steering fluid cooler; a controller configured to store instructions in non-transitory memory, that when executed, cause the controller to: receive an indication of an engine speed; receive an indication of a steering wheel angle; responsive to a condition wherein engine speed is greater than an engine speed threshold for more than a first duration and wherein steering wheel angle is greater than a steering wheel angle threshold for more than the first duration, overriding a current engine cooling fan logic; and adjusting operation of the engine cooling fan for a second duration based on the engine speed and the steering wheel angle. The technical effect of implementing this system is an increase of airflow across the power steering fluid cooler during conditions likely to stress the power steering system. In this way, the power steering pump may be prevented from overheating without adding additional hardware to the power steering system, such as a larger cooler or a temperature sensor. In such an example system, the controller may additionally or alternatively be further configured to store instructions in non-transitory memory, that when executed, cause the controller to: revert to a prior engine cooling fan logic following the second duration. In any of the preceding example systems, the controller may additionally or alternatively be further configured to store instructions in non-transitory memory, that when executed, cause the controller to: maintain current engine cooling fan logic responsive to an engine speed being less than the engine speed threshold or a steering wheel angle less than the steering wheel angle threshold.

In yet another example, a method for an engine is presented, comprising: adjusting operation of an engine cooling fan based on an engine speed greater than an engine speed threshold and a steering wheel angle greater than a steering wheel angle; and reducing engine speed to a first predetermined engine speed based on an indication that the steering wheel angle is greater than the steering wheel angle threshold for a predetermined duration during adjusted operation of the engine cooling fan. The technical effect of implementing such a method is an active mitigation of power steering pump wear, as engine speed is reduced under conditions likely to affect pump durability. In this way, overheating of the pump can be prevented in some circumstances. In such a method, the method may additionally or alternatively comprise: following reducing engine speed to the first predetermined engine speed, reducing engine speed to an intermediate predetermined engine speed, lower than the first predetermined engine speed based on a steering wheel angle being greater than the steering wheel angle threshold for an intermediate predetermined duration. In any of the preceding example methods, the method may additionally or alternatively comprise: following reducing engine speed to the intermediate predetermined engine speed, actively pushing down engine speed based on steering wheel angle being greater than the steering wheel angle threshold for a maximum predetermined duration. In any of the preceding example methods, the method may additionally or alternatively comprise: ceasing actively pushing down engine speed responsive to reaching a minimum engine speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
an engine cooling system including at least one engine cooling fan;
a steering wheel coupled to a hydraulic power steering system, the hydraulic power steering system including a power steering fluid cooler and a pump driven by the engine; and
a controller configured to store instructions in non-transitory memory that, when executed, cause the controller to:
receive an indication of an engine speed;
receive an indication of a steering wheel angle;
responsive to a condition wherein the engine speed is greater than an engine speed threshold for more than a first duration and wherein the steering wheel angle is greater than a steering wheel angle threshold for more than the first duration, overriding a current engine cooling fan logic; and
adjusting operation of the at least one engine cooling fan for a second duration based on the engine speed and the steering wheel angle.

2. The system of claim 1, wherein the controller is further configured to store instructions in non-transitory memory that, when executed, cause the controller to:
revert to a prior engine cooling fan logic following the second duration.

3. The system of claim 1, wherein the controller is further configured to store instructions in non-transitory memory that, when executed, cause the controller to:
maintain the current engine cooling fan logic responsive to the engine speed being less than the engine speed threshold or the steering wheel angle being less than the steering wheel angle threshold.

4. The system of claim 1, wherein adjusting the operation of the at least one engine cooling fan for the second duration includes maintaining the at least one engine cooling fan on for the second duration.

5. The system of claim 4, wherein the second duration is calculated as a function of the engine speed and the steering wheel angle.

6. The system of claim 5, wherein the second duration is decreased as the engine speed is decreased, and wherein the second duration is decreased as the steering wheel angle is decreased.

7. The system of claim 1, wherein the controller further comprises instructions for, responsive to an engine coolant temperature decreasing below a threshold engine coolant temperature during the second duration, decreasing a speed of the at least one engine cooling fan for a remainder of the second duration.

8. The method of claim 1, wherein the engine speed is greater than the engine speed threshold for more than the first duration concurrently with when the steering wheel angle is greater than the steering wheel angle threshold for more than the first duration.

9. A system for an engine, comprising:
an engine cooling system including at least one engine cooling fan;
a steering wheel coupled to a hydraulic power steering system, the hydraulic power steering system including an engine-driven pump; and
a controller configured to store instructions in non-transitory memory that, when executed, cause the controller to:
adjust operation of the at least one engine cooling fan based on an engine speed and a steering wheel angle responsive to detecting a condition where both the engine speed is greater than the engine speed threshold for a first duration and the steering wheel angle is greater than a steering wheel angle threshold for more than the first duration.

10. The system of claim 9, wherein the first duration is a predetermined duration.

11. The system of claim 10, wherein the first duration is based on current operating conditions.

12. The system of claim 9, where adjusting the at least one engine cooling fan includes maintaining the engine cooling fan on for a second duration.

13. The system of claim 12, wherein the second duration is calculated based on the engine speed and the steering wheel angle.

14. The system of claim 9, wherein the controller, further comprises instructions for, responsive to an engine coolant temperature decreasing below a threshold engine coolant temperature during a second duration, decreasing a speed of the at least one engine cooling fan for a remainder of the second duration.

15. The system of claim 9, wherein the controller further comprises instructions for reverting control of the at least one engine cooling fan to a prior engine cooling fan logic following a second duration.

16. The system of claim 15, wherein the prior engine cooling fan logic adjusts the at least one engine cooling fan based on an engine coolant temperature.

* * * * *